US011390332B2

(12) United States Patent
Charles et al.

(10) Patent No.: US 11,390,332 B2
(45) Date of Patent: Jul. 19, 2022

(54) SEMI-ACTIVE CAB SUSPENSION FOR LARGE AGRICULTURAL VEHICLES

(71) Applicant: CNH Industrial America LLC, New Holland, PA (US)

(72) Inventors: Jacob Charles, AKron, PA (US); Shane M. Scott, Bolingbrook, IL (US); Lucas Koch, St. Louis Park, MN (US); Rajeshwar Adupala, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 437 days.

(21) Appl. No.: 16/678,566

(22) Filed: Nov. 8, 2019

(65) Prior Publication Data

US 2020/0148285 A1 May 14, 2020

Related U.S. Application Data

(60) Provisional application No. 62/758,543, filed on Nov. 10, 2018.

(51) Int. Cl.
| | |
|---|---|
| *B62D 33/06* | (2006.01) |
| *B62D 21/02* | (2006.01) |
| *B62D 21/09* | (2006.01) |
| *B60K 17/04* | (2006.01) |
| *B62D 49/00* | (2006.01) |

(Continued)

(52) U.S. Cl.
CPC .......... *B62D 33/0604* (2013.01); *A01B 76/00* (2013.01); *B60K 17/043* (2013.01); *B60K 17/16* (2013.01); *B62D 21/02* (2013.01); *B62D 21/09* (2013.01); *B62D 33/0617* (2013.01); *B62D 49/00* (2013.01); *A01B 59/002* (2013.01)

(58) Field of Classification Search
CPC .... B62D 33/0604; B62D 21/02; B62D 21/09; B62D 33/0617; B62D 49/00; A01B 76/00; A01B 59/002; B60K 17/043; B60K 17/16; B60K 17/00; B60Y 2400/86; B60Y 2200/22; B60Y 2200/221
USPC ...................................................... 296/190.07
See application file for complete search history.

(56) References Cited

U.S. PATENT DOCUMENTS 9,283,993 B2 * 3/2016 Rager ..................... B62D 24/04
10,494,039 B2 * 12/2019 Young ............... B62D 33/0604
(Continued)

FOREIGN PATENT DOCUMENTS

EP 1661796 A2 * 5/2006 ......... B62D 33/0608

*Primary Examiner* — Pinel E Romain
(74) *Attorney, Agent, or Firm* — Rickard K. DeMille; Rebecca L. Henkel

(57) ABSTRACT

A suspension system for a cab of an agricultural vehicle having a frame. The suspension system includes a pair of first mounts configured for connecting the cab to the frame at a first region, a pair of second mounts configured for connecting the cab to the frame at a second region, and a pair of actuators configured for connecting the cab to the frame at a third region. The actuators are configured for variably damping a movement of the cab. The suspension system also includes a first suspension linkage laterally connected in between the second mounts. The suspension system also includes a second suspension linkage configured for connecting the cab to the frame at a fourth region. The second suspension linkage is configured for limiting a rotation of the cab about the longitudinal axis of the frame.

20 Claims, 1 Drawing Sheet

(51) Int. Cl.
   *A01B 76/00*  (2006.01)
   *B60K 17/16*  (2006.01)
   *A01B 59/00*  (2006.01)

(56) References Cited

U.S. PATENT DOCUMENTS

| | | | |
|---|---|---|---|
| 10,569,813 B2* | 2/2020 | Davis | B62D 33/0604 |
| 2005/0082127 A1* | 4/2005 | Barber | B62D 33/0608 |
| | | | 188/266.2 |
| 2018/0029433 A1* | 2/2018 | Marble | B60G 17/02 |
| 2018/0178856 A1* | 6/2018 | Davis | B60G 17/016 |
| 2020/0255069 A1* | 8/2020 | Davis | B60G 17/08 |

* cited by examiner

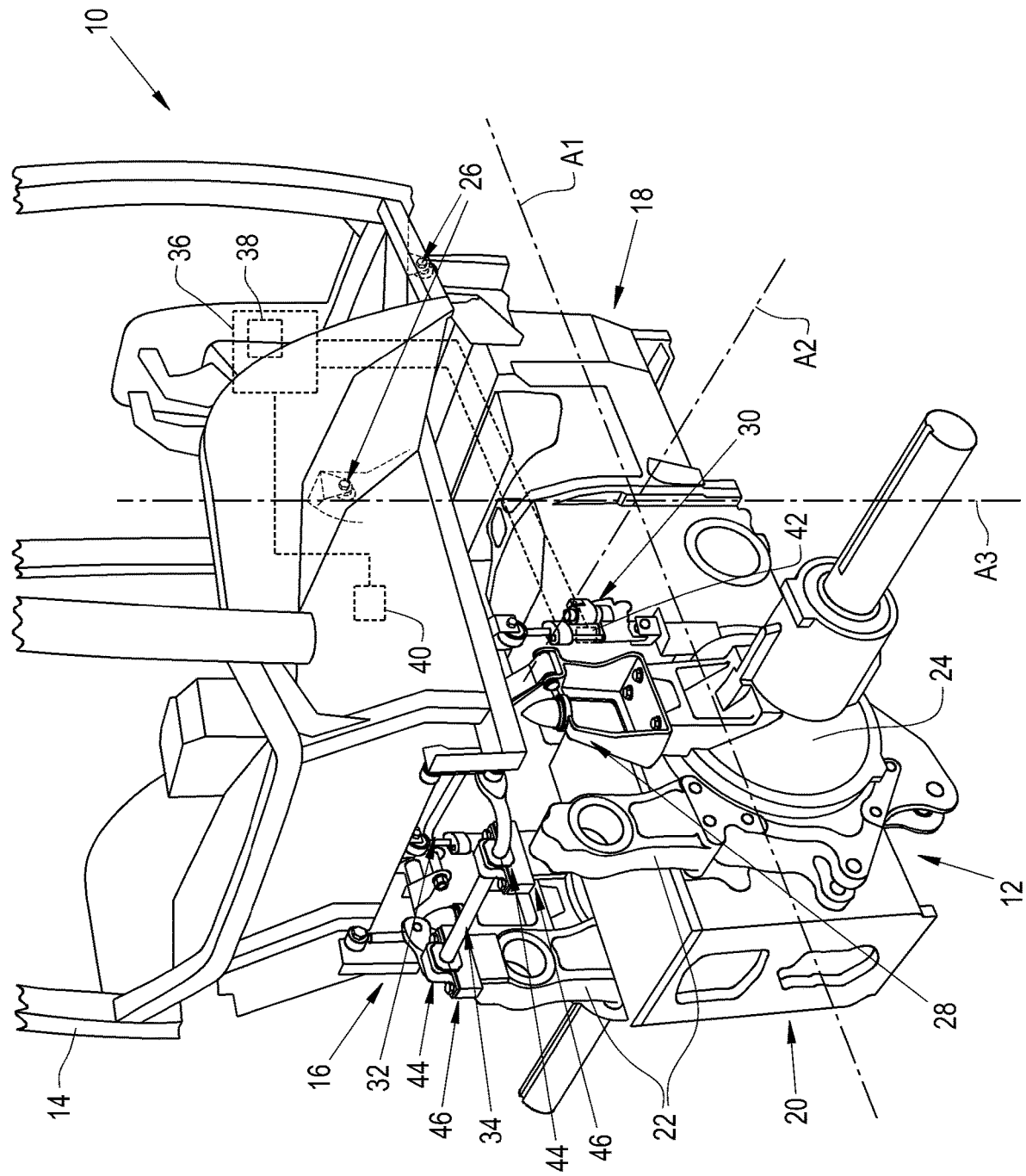

SEMI-ACTIVE CAB SUSPENSION FOR LARGE AGRICULTURAL VEHICLES

CROSS REFERENCE TO RELATED APPLICATIONS

This is a non-provisional application based upon U.S. provisional patent application Ser. No. 62/758,543, entitled "SEMI-ACTIVE CAB SUSPENSION FOR LARGE AGRICULTURAL VEHICLES", filed Nov. 10, 2018, which is incorporated herein by reference.

BACKGROUND OF THE INVENTION

The present invention pertains to agricultural vehicles and, more specifically, to a suspension for agricultural vehicles.

Agricultural or industrial vehicles, such as tractors, combines, backhoes, cranes, or dozers, generally include a chassis, supported by wheels or tracks, a prime mover, and a cab. Large vehicles typically include a cab that is separately assembled as an individual unit and subsequently mounted onto the chassis via support mounts. As the vehicle traverses a field or roadway, vibrational and/or impact forces may be imparted from the chassis to the cab, which in turn reduces ride quality and operator comfort. Since a cab is generally a separate unit, the support mounts which connect the cab to the chassis may transmit and amplify the vibrational and/or impact forces experienced by the chassis onto the cab. Such forces may cause the cab to jounce, rotate from side to side and/or front to back, or vibrate. For example, impact forces resulting from the wheels traveling over undulations in the field may cause the cab to vertically jounce. These impact forces are only exacerbated by the augmented speeds of modern agricultural vehicles. Additionally, for example, draft forces from an implement acting on the hitch of a tractor or acceleration and deceleration forces, e.g. braking forces, may cause the cab to rotate from front to back about a lateral axis of the chassis. Hence, the forces transmitted to the cab during normal operation of the vehicle may lead to a diminished ride quality as well as operator discomfort and fatigue.

Large tractors generally include a cab suspension system for damping vibrations and impacts acting on the cab to enhance the ride quality and operator comfort. A typical cab suspension system includes support mounts, some of which may be rubber mounts, and compression springs. Further, a stabilizing linkage, such as Panhard bar, can be added to the support mounts of the cab to limit the vertical travel of the cab. In conjunction, the rubber mounts, compression springs, and Panhard bar may provide for passive damping of the forces imparted to the cab.

However, passive-damping suspension systems may not be able to satisfactorily accommodate various field or roadway conditions. For instance, support mounts that include compression springs have a limited operational range because the springs have a specific preload that may accommodate a limited range of impact forces acting on the cab. Hence, the preload of the springs may not be able to adequately accommodate certain field conditions at higher operational speeds of the agricultural vehicle, which in turn may cause the operator to operate the agricultural vehicle at a lower speed. Thus, the operator may sacrifice field-working efficiency for operator comfort because the suspension system is limited by the parameters of the passive-damping support mounts.

What is needed in the art is a cab suspension system that may cost-effectively and efficiently accommodate a wide range of operating conditions of an agricultural vehicle.

SUMMARY OF THE INVENTION

In one exemplary embodiment formed in accordance with the present invention, there is provided a cab suspension system that generally includes rubber mounts, variable damping hydraulic cylinders, a Panhard bar, and a mechanical anti-roll bar. The cab suspension system may also include an electronic control unit operably connected to the hydraulic cylinders and various sensors which provide feedback signals to the control unit. The electronic control unit may selectively and variably actuate the hydraulic cylinders to actively optimize the suspension system in response to varying operational conditions.

In another exemplary embodiment formed in accordance with the present invention, there is provided a suspension system for a cab of an agricultural vehicle having a frame. The frame having a longitudinal axis, a lateral axis, and a vertical axis. The suspension system includes a pair of first mounts configured for connecting the cab to the frame at a first region. The first mounts are in the form of semi-flexible mounts. The suspension system includes a pair of second mounts configured for connecting the cab to the frame at a second region, and a pair of actuators configured for connecting the cab to the frame at a third region. The actuators are configured for variably damping a movement of the cab. The suspension system also includes a first suspension linkage laterally connected in between the second mounts. The first suspension linkage is configured for limiting a motion of the cab along the lateral axis of the frame. The suspension system also includes a second suspension linkage configured for connecting the cab to the frame at a fourth region. The second suspension linkage is configured for limiting a rotation of the cab about the longitudinal axis of the frame.

In yet another exemplary embodiment formed in accordance with the present invention, there is provided an agricultural vehicle including a frame having a longitudinal axis, a lateral axis, and a vertical axis, a cab, and a suspension system for the cab. The suspension system includes a pair of first mounts connecting the cab to the frame at a first region. The first mounts are in the form of semi-flexible mounts defining a pivot axis of the cab about the lateral axis of the frame. The suspension system also includes a pair of second mounts connecting the cab to the frame at a second region and a pair of actuators connecting the cab to the frame at a third region. The actuators variably damp a movement of the cab. The suspension system also includes a first suspension linkage laterally connected in between the second mounts. The first suspension linkage limits a motion of the cab along the lateral axis of the frame. The suspension system also includes a second suspension linkage connecting the cab to the frame at a fourth region. The second suspension linkage limits a rotation of the cab about the longitudinal axis of the frame.

One possible advantage of the exemplary embodiment of the cab suspension system is that the angle between the cab and the chassis is automatically adjusted, which provides for consistent and optimized ride quality across a wide range of operating conditions.

Another possible advantage of the exemplary embodiment of the cab suspension system is that the suspension of the cab can be specifically optimized for a given operator, regardless of the weight of the operator.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawing:

FIG. 1 illustrates a perspective view of an exemplary embodiment of an agricultural vehicle including a frame, a cab, and a semi-active cab suspension, in accordance with an exemplary embodiment of the present invention.

DETAILED DESCRIPTION OF THE INVENTION

The terms "forward", "rearward", "left" and "right", when used in connection with the agricultural vehicle and/or components thereof are usually determined with reference to the direction of forward operative travel of the agricultural vehicle, but again, they should not be construed as limiting. The terms "longitudinal" and "transverse" are determined with reference to the fore-and-aft direction of the agricultural vehicle and are equally not to be construed as limiting.

Referring now to FIG. 1, there is shown an exemplary embodiment of an agricultural vehicle 10. As shown, the agricultural vehicle 10 is in the form of a tractor, such as a Case IH Magnum™ series Cash-Crop-High (CCH) tractor. However, the agricultural vehicle 10 may be in the form of any desired industrial or agricultural vehicle, such as a combine, backhoe, crane, dozer, skidsteer loader, etc. The agricultural vehicle 10 generally includes a frame 12, e.g. a chassis 12, supported by wheels or tracks, a prime mover, a cab 14, and a suspension system 16 for supporting and connecting the cab 14 to the frame 12.

The frame 12 may have a longitudinal axis A1, a lateral axis A2, and a vertical axis A3. The frame 12 may include a transmission housing 18, a differential housing 20, a pair of three-point hitch brackets 22 connected to the differential housing 20, and a pair of axle housings 24 mounted on a respective side of the differential housing 20.

The cab 14 may be separately assembled as an individual unit. The cab 14 may include a frame composed of a roof, vertical supports, and a floor section (unnumbered). The floor section can be composed of a front end, a pair of bottom side rails, and a rear end. The cab 14 may also include therein a user interface and a seat for an operator (unnumbered).

The suspension system 16 for the cab 14 generally includes a pair of first, front mounts 26, a pair of second, rear mounts 28, a pair of actuators 30, a first suspension linkage 32, and a second suspension linkage 34. The agricultural vehicle 10 may further include an electronic control unit (ECU) 36, such as a controller 36 with a memory 38, and at least one sensor, such as a pair of sensors 40, 42. It should be appreciated that that the ECU 36 and sensor(s) 40, 42 may be incorporated as part of the suspension system 16.

The front mounts 26 connect the cab 14 to the frame 12 at a first region, such as at the forward end of the transmission housing 18 and adjacent to the front end of the cab 14. As shown, the front mounts 26 are connected to the transmission housing 18; however, the front mounts 26 can be connected to any desired portion of the frame 12. The front mounts 26 may be in the form of semi-flexible mounts, such as rubber mounts 26. The front mounts 26 define a front pivot axis of the cab 14 about the lateral axis A2 of the frame 12. The rubber mounts 26 can be in the form of any desired rubber mounts.

The rear mounts 28 connect the cab 14 to the frame 12 at a second region, such as at the axle housings 24 and adjacent to the rear end of the cab 14. As shown, the rear mounts 28 are connected to the axle housings 24; however, the rear mounts 28 can be connected to any desired portion of the frame 12. The rear mounts 28 can be in the form of any desired mounts. For instance, each rear mount 28 can include a lower bracket connected to the axle housing 24 and an upper bracket connected to the cab 14.

The left and right actuators 30 connect the cab 14 to the frame 12 at a third region, such as adjacent to a middle section of the transmission housing 18 and adjacent to the rear end of the cab 14. Each actuator 30 is connected in between the bottom of the cab 14 and a respective side of the transmission housing 18. It is noted that only the right actuator 30 is shown in FIG. 1; however, the left actuator is substantially similar to the right actuator 30, except that the left actuator is connected to the left, unseen side of the transmission housing 18. The actuators 30 are configured for variably damping a movement of the cab 14. The actuators 30 absorb and counteract a rotation of the cab 14 about the lateral axis A2 of the frame 12 and a substantially vertical movement of the cab 14. As used herein, a substantially vertical movement may refer to the substantially vertical up and down movement of the cab 14, plus or minus 45 degrees from the vertical axis A3. It should be appreciated that the actuators 30 may also assist the second suspension linkage 34 in limiting a rotation of the cab 14 about the longitudinal axis of the frame 12.

Each actuator 30 may be in the form of any desired actuator, such as a hydraulic or electric cylinder. In the present exemplary embodiment, the actuators 30 are in the form of hydraulic cylinders 30. Hence, the suspension system 16 may include various hydraulic fluid lines to connect the hydraulic cylinders 30 to the hydraulic system(s) of the agricultural vehicle 10. For example, the hydraulic cylinders 30 may be fluidly coupled to a hydraulic leveling valve which supplies a desired amount of hydraulic fluid to the hydraulic cylinders 30 from a hydraulic fluid reservoir of the agricultural vehicle 10. It should be appreciated that the suspension system 16 may include more than two actuators 30 such as four, six, or more actuators 30 connected in between the cab 14 and the frame 12.

The first suspension linkage 32 is laterally interconnected in between the rear mounts 28. The first suspension linkage 32 limits a motion of the cab 14 along the lateral axis A2 of the frame 12. The first suspension linkage 32 can be in the form of any desired linkage, such as a Panhard bar 32.

The second suspension linkage 34 connects the cab 14 to the frame 12 at a fourth region, such as adjacent to the rear end of the frame 12 and the rear end of the cab 14. The second suspension linkage 34 is connected to each three-point hitch bracket 22; however, the second suspension linkage 34 may be connected to any desired portion of the frame 12. The second suspension linkage 34 limits a rotation of the cab 14 about the longitudinal axis of the frame 12. The second suspension linkage 34 may be in the form of an anti-roll bar 34. The anti-roll bar 34 may be in the form of a "U"-shaped bar. However, the anti-roll bar 34 may have any desired shape. The ends of the anti-roll bar 34 are respectively connected to the cab 14. The ends of the anti-roll bar 34 may comprise drop links which connect to the cab 14. The anti-roll bar 34 may comprise a pair of bushings 44 and bushing clamps (unnumbered). The bushings 44 may surround the anti-roll bar 34 at two separate locations such that one bushing 44 is located on one side of the longitudinal axis A1 and the other bushing 44 is located on the other side of the longitudinal axis A1.

Further, the suspension system 16 may include a pair of anti-roll bar mounts 46, which connect the anti-roll bar 34 to the frame 12. More particularly, each anti-roll bar mount 46 is connected to each bushing 44 at one end and to each three-point hitch bracket 22 at the other end. The anti-roll bar mounts 46 may be in the form of "C"-brackets or castings which partially house the bushings 44. As shown, one anti-roll bar mount 46 is located on one side of the longitudinal axis A1 of the frame 12 and the other anti-roll bar mount 46 is located on the other side of the longitudinal axis A1 of the frame 12. The bushing brackets and anti-roll bar mounts 46 may connected together, in order to secure the bushings 44, via fasteners.

The ECU 36 can be operably connected to each actuator 30 and to the one or more sensors 40, 42. The ECU 36 may also include the tangible computer readable medium, e.g. memory 38, for storing software code or instructions. The ECU 36 may be in the form of any desired ECU or controller, and the ECU 36 may be incorporated into existing hardware and/or software of the agricultural vehicle 10 or suspension system 16.

The at least one sensor may be in the form of an accelerometer 40 located on the cab 14 and operably connected to the ECU 36. Additionally, the at least one sensor can be in the form of an accelerometer 40 and one or more position sensors 42. Each sensor 40, 42 may send a feedback signal to the ECU 36 such that the ECU 36 selectively actuates each actuator 30 responsive to the signal(s) provided by the one or more sensors 40, 42. Furthermore, it should be appreciated that the suspension system 16 may include more than one accelerometer, such as two accelerometers mounted onto the cab 14. Additionally or alternatively, the suspension system 16 may include at least one accelerometer mounted onto the frame 12. Further, the suspension system 16 may additionally include multiple position sensors 42, which may each be connected to a respective actuator 30, the cab 14, and/or frame 12. For example, each position sensor 42 may be integrally formed with a respective actuator 30.

The suspension system 16 may perform a method of automatically optimizing the suspension of the cab 14 to accommodate a given operational condition of the agricultural vehicle 10. More particularly, the suspension system 16 may sense the acceleration of the cab 14 by the accelerometer 40. The suspension system 16 may also sense the position of the actuators 30 using the integral position sensors 42. Thereby, when the cab 14 experiences a change from its resting position, the ECU 36 will receive the respective feedback signals from the sensors 40, 42. Then, the ECU 36 may continuously calculate an optimal damping rate to selectively actuate each actuator 30 to absorb and counteract a movement of the cab 14, before the ECU 36 returns the cab 14 to its resting position. For instance, the ECU 36 may adjust one or both of the actuators 30 to counteract the rotation of the cab 14 about the lateral axis A2 and the substantially vertical movement of the cab 14 as the cab 14 translates up and down relative to the vertical axis A3. Additionally, the ECU 36 may further automatically adjust each actuator 30 to counteract a rotational movement of the cab 14 about the longitudinal axis A1. Additionally, an operator may select one or more presets of the suspension system 16 so that the cab 14 can be initially positioned and/or the ECU 36 may set an initial preload onto the actuators 30. For example, the operator may select a roadway or field preset such that the ECU 36 is initially conditioned to accommodate the specific operating condition of the agricultural vehicle 10.

It is to be understood that the steps of the method of the suspension system 16 may be performed by the controller 36 upon loading and executing software code or instructions. The controller 36 may include software code or instructions which are tangibly stored on the tangible computer readable medium 38. The computer readable medium 38 may be in the form of a magnetic medium, e.g., a computer hard drive, an optical medium, e.g., an optical disc, solid-state memory, e.g., flash memory, or other storage media known in the art. Thus, any of the functionality performed by the controller 36 described herein may be implemented in software code or instructions which are tangibly stored on the tangible computer readable medium 38. The controller 36 loads the software code or instructions via a direct interface with the computer readable medium 38 or via a wired and/or wireless network. Upon loading and executing such software code or instructions by the controller 36, the controller 36 may perform any of the functionality described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A suspension system for a cab of an agricultural vehicle having a frame, the frame having a longitudinal axis, a lateral axis, and a vertical axis, the suspension system comprising:
   a pair of first mounts configured for connecting the cab to the frame at a first region, the first mounts are in the form of semi-flexible mounts;
   a pair of second mounts configured for connecting the cab to the frame at a second region;
   a pair of actuators configured for connecting the cab to the frame at a third region, the actuators are configured for variably damping a movement of the cab;
   a first suspension linkage laterally connected in between the second mounts, the first suspension linkage is configured for limiting a motion of the cab along the lateral axis of the frame; and
   a second suspension linkage configured for connecting the cab to the frame at a fourth region, the second suspension linkage is configured for limiting a rotation of the cab about the longitudinal axis of the frame.

2. The suspension system of claim 1, further comprising an electronic control unit operably connected to each actuator.

3. The suspension system of claim 2, further comprising at least one sensor operably connected to the electronic control unit and providing a signal to the electronic control unit such that the electronic control unit selectively actuates each actuator responsive to the signal provided by the at least one sensor.

4. The suspension system of claim 3, wherein the at least one sensor comprises an accelerometer configured for connecting to the cab and a pair of position sensors which are each integral with a respective actuator.

5. The suspension system of claim 4, wherein the electronic control unit is configured for calculating an optimal damping rate to selectively actuate each actuator to absorb and counteract a rotation of the cab about the lateral axis of the frame and a substantially vertical movement of the cab.

6. The suspension system of claim 1, wherein the first suspension linkage is in the form of a Panhard bar.

7. The suspension system of claim 1, wherein the second suspension linkage is in the form of an anti-roll bar.

8. The suspension system of claim 7, further including a pair of anti-roll bar mounts configured for connecting the anti-roll bar to the frame.

9. The suspension system of claim 8, wherein the anti-roll bar comprises a pair of bushings, and each anti-roll bar mount respectively connects to each bushing.

10. An agricultural vehicle, comprising:
  a frame having a longitudinal axis, a lateral axis, and a vertical axis;
  a cab; and
  a suspension system for the cab, comprising:
    a pair of first mounts connecting the cab to the frame at a first region, the first mounts are in the form of semi-flexible mounts defining a pivot axis of the cab about the lateral axis of the frame;
    a pair of second mounts connecting the cab to the frame at a second region;
    a pair of actuators connecting the cab to the frame at a third region, the actuators variably damping a movement of the cab;
    a first suspension linkage laterally connected in between the second mounts, the first suspension linkage limiting a motion of the cab along the lateral axis of the frame; and
    a second suspension linkage connecting the cab to the frame at a fourth region, the second suspension linkage limiting a rotation of the cab about the longitudinal axis of the frame.

11. The agricultural vehicle of claim 10, further comprising an electronic control unit operably connected to each actuator.

12. The agricultural vehicle of claim 11, further comprising at least one sensor operably connected to the electronic control unit and providing a signal to the electronic control unit such that the electronic control unit selectively actuates each actuator responsive to the signal provided by the at least one sensor.

13. The agricultural vehicle of claim 12, wherein the at least one sensor comprises an accelerometer connected to the cab and a pair of position sensors which are each integral with a respective actuator.

14. The agricultural vehicle of claim 13, wherein the electronic control unit is configured for calculating an optimal damping rate to selectively actuate each actuator to absorb and counteract a rotation of the cab about the lateral axis of the frame and a substantially vertical movement of the cab.

15. The agricultural vehicle of claim 10, wherein the first suspension linkage is in the form of a Panhard bar.

16. The agricultural vehicle of claim 10, wherein the second suspension linkage is in the form of an anti-roll bar.

17. The agricultural vehicle of claim 16, wherein the suspension system furthers includes a pair of anti-roll bar mounts connecting the anti-roll bar to the frame.

18. The agricultural vehicle of claim 17, wherein the anti-roll bar comprises a pair of bushings, and each anti-roll bar mount respectively connects to each bushing.

19. The agricultural vehicle of claim 10, wherein the frame comprises a transmission housing, a differential housing, a pair of three-point hitch brackets, and a pair of axle housings mounted on a respective side of the differential housing.

20. The agricultural vehicle of claim 19, wherein the first mounts are connected to the transmission housing in the first region, the second mounts are connected to the axle housings in the second region, the actuators are connected to the transmission housing in the third region, and the second suspension linkage is connected to the three-point hitch brackets.

* * * * *